Patented Dec. 25, 1928.

1,696,479

UNITED STATES PATENT OFFICE.

CARL NELSON HAND, OF NITRO, WEST VIRGINIA, ASSIGNOR TO THE RUBBER SERVICE LABORATORIES CO., OF AKRON, OHIO, A CORPORATION OF OHIO.

MANUFACTURE OF ACETALDEHYDE.

No Drawing.   Application filed April 12, 1926.   Serial No. 101,563.

My present invention is directed to the art of manufacturing acetaldehyde by a process wherein acetlyene is contacted with an acid solution in the presence of a catalytic agent, and is particularly directed to an improvement in that process whereby the acetaldehyde produced is readily and economically separated from the unchanged acetlyene always present in the reaction products.

Heretofore, in the manufacture of acetaldehyde from acetlyene, it has been customary to pass the gases emerging from the reaction chamber containing the acid and catalyst, through a plurality of water and brine cooled condensers and scrubbers arranged in series. Inasmuch as by the earlier processes, not more than 10% of the acetylene is ordinarily converted into aldehyde by passage through the acid solution of the catalyst, the gases flowing through the condenser contain a large volume of non-condensable vapors which render the complete condensation of the aldehyde practically impossible to perform. Even by employing temperatures from $-10°$ to $-15°$ C. in the condensers, appreciable losses of aldehyde resulted during the condensation and subsequent purification process.

I have now found that instead of condensing out the acetaldehyde from the gaseous mixture, and then using the condensed aldehyde for the manufacture of derivatives of or products from the aldehyde, it is far more efficient and economical to pass the mixture of acetylene and acetaldehyde vapors as it emerges from the reaction vessel and coolers as hereinafter described, directly through any material with which it is desired to combine the aldehyde and with which the acetylene is non-reactive. Although acetaldehyde will form addition products with many substances, such as sodium bisulfite and hydrogen cyanide, I have found it more desirable to react the aldehyde with compounds such as amidophenol, p-amido-di-methyl-aniline, and particularly with the primary aromatic amines such as aniline, the toluidines, the xylidines, and the like.

As an example of one mode of practicing my invention, I may employ it in conjunction with the manufacture of the acetaldehyde reaction product of a Schiff's base, as described in U. S. 1,467,984, issued September 11, 1923, to North. According to the process described in the patent mentioned, acetaldehyde vapors are passed through a series of tanks, each containing a quantity of an aromatic primary amine, for a sufficient period of time to complete a reaction wherein three molecular proportions of acetaldehyde have combined with two molecular proportions of the amine.

According to my present invention, acetaldehyde is prepared, preferably in accordance with the method disclosed in a copending application, Serial No. 101,562, filed April 12, 1926, by myself and others as joint inventors. By this process, acetylene is passed in the necessary quantity, for example at the rate of approximately 100 cubic feet per hour to every cubic foot of acid-catalyst mixture employed, and under a pressure of substantially 10 pounds per square inch above atmospheric pressure, through a sulfuric acid solution containing from 25 to 35% acid, to which is added a sufficient quantity of a catalyst, as will maintain the temperature of the acid at from $68°$ to $80°$ C. by the exothermic reaction taking place. As a catalyst, I prefer to employ one such as mercurous sulphate that is but slightly soluble in the acid solution present. By passage of the acetylene through the solution under the conditions set forth, approximately 16% of the acetylene is converted into acetaldehyde. The mixture of gases and vapors is passed through a reflux condenser maintained at a temperature of about $40°$ C., thence through a trap containing a quantity of material such as coke, pumice, unglazed porcelain or brick, and the like to remove any traces of acid mechanically carried by the gases, and thence through a second condenser and trap, whereby the gases are further cooled to about 21 to $30°$ C., and again treated for the complete removal of all traces of acid.

The mixture of acetylene and acetaldehyde vapor is then led through a series of absorbers preferably although not necessarily four in number, each containing a quantity of a primary amine such as aniline or other material with which it is desired to combine the aldehyde. The reaction between aniline and acetaldehyde is an exothermic combination, and as practiced by North, a sufficient qantity of heat is evolved to maintain the mass at is optimum reacting condition. In my process, however, so large a volume of inert gas is passed through the absorbent liquor that unless modified as hereinafter described, the heat would be rapidly removed therefrom, and as the proportion of aniline-acetaldehyde reaction product increased, the mass might become so viscous that the passage of the gases therethrough would be slowed up materially, with the result that an appreciable back pressure would be built up in the entire system. To avoid this, I have found that it is desirable to bleed into the absorber a sufficient quantity of steam to maintain the temperature of the aniline in the first absorber at from 70 to 90° C., whereby the mass is maintained sufficiently fluid so that the gases flow through and readily react with the absorbent. The reaction between aniline and acetaldehyde may also be catalyzed, if desired, by the addition of minute qantities of a suitable material, for example, acetic acid.

Although the greater part of the aldehyde is removed from the acetylene-acetaldehyde mixture by the aniline in the first absorber, it is, however, desirable to flow the gases through the aniline in the four absorbers as mentioned. The contents of the first absorber may be stirred, if desired, by providing therefor any of the well known devices for this purpose, but the passage of such large quantities of gas through the aniline usually renders any stirring unnecessary. It is found after the passage of a current of the mixture of acetylene and acetaldehyde for approximately 10 to 12 hours through the liquid in the absorber, that control tests show that the aniline has completely reacted with the aldehyde to form the compound having the formula $C_{18}H_{20}N_2$ according to the following reaction:

$$3CH_3CHO + 2C_6H_5NH_2 = 3H_2O + C_{18}H_{20}N_2$$

The reaction product is then run off into a cooling tank and the contents of the second absorber are run into the first absorber, the contents of the third absorber are run into the second absorber, the contents of the fourth absorber are run into the third absorber, and a charge of fresh aniline or other amine is run into the fourth absorber from the storage tank. The system is then ready for further absorption of aldehyde and for the production of another quantity of a finished aldehyde-amine reaction product in the first absorber in the manner as described.

Inasmuch as the reaction taking place in the absorber in the example set forth is a condensation and water is one of the reaction products, it is desirable to interpose a reflux condenser between each absorber, and to pass the gases passing out from each absorber through the condenser. This condenses substantially all the water removed from each absorber and prevents the moisture from being carried over into another absorber. In order to prevent the condensed moisture from refluxing back into the absorber, a trap is positioned between the absorber and condenser, and the water is removed from the system by means of the trap. By operating in this manner, it is found that the aldehyde-amine reaction product drawn off from the first absorber is sufficiently dry to be used as a rubber vulcanization accelerator without further treatment.

The acetylene passing out of the fourth absorber is found to be completely freed from all traces of aldehyde originally present, and this acetylene is flowed through a trap containing pumice, glass beads or other similar inert material to remove any traces of aniline mechanically carried by the gas, and is then introduced, preferably by means of a blower or other suitable means into the gas line leading to the acid-catalytic mixture to be converted into another increment of aldehyde.

Although I have described the separation of acetaldehyde from a mixture of aldehyde and acetylene produced by sujecting acetylene to the action of a solution of sulfuric acid carrying a catalyst by a process wherein I have specified certain acid concentrations, temperatures employed and other reacting conditions, it is to be understood that my invention is not limited to the particular process described but is applicable to the separation of a mixture of acetylene and acetaldehyde produced in any appropriate manner by any desired process. It is to be understood that my invention is not limited by any example or theory advanced by way of explanation but is limited solely by the following claims appended hereto as a part of this specification whereby I intend to claim all novelty inherent in my invention as broadly as the prior art permits.

What I claim is:

1. A process of separating acetaldehyde from a mixture of acetaldehyde and acetylene which comprises passing the said mixture through an aromatic organic compound that will chemically combine with the acetaldehyde present in the said mixture.

2. A process of separating acetaldehyde from a mixture of acetaldehyde and acetylene which comprises passing the said mixture through a primary aromatic amine.

3. A process of separating acetaldehyde from a mixture of acetaldehyde and acetylene which comprises passing the said mixture through aniline.

4. A process of separating acetaldehyde from a mixture of acetaldehyde and acetylene which comprises passing the said mixture through aniline maintained at a temperature of from 70° to 90° centigrade.

5. In the process of preparing acetaldehyde from acetylene by passing acetylene through an acid solution, the step of separating the acetaldehyde from the mixture of acetylene and acetaldehyde so produced which comprises passing the said mixture through a primary aromatic amine and returning the acetylene to the acid solution for further treatment.

6. In the process of preparing acetaldehyde from acetylene by passing acetylene through a solution of sulfuric acid containing from 25 to 35% acid and carrying a catalyst, the step of separating the acetaldehyde from the mixture of acetylene and acetaldehyde so produced, which comprises passing the said mixture through aniline and returning the acetylene to the acid solution for further treatment.

7. In the process of preparing acetaldehyde from acetylene by passing acetylene through a 25 to 35% sulfuric acid solution carrying sufficient mercurous sulphate to maintain the temperature of the acid solution at from 68 to 80° C., the step of separating the acetaldehyde from the mixture of acetylene and acetaldehyde so produced, which comprises passing the said mixture through aniline maintained at from 70 to 90° C. and returning the acetylene to the acid solution for further treatment.

8. In the process of preparing acetaldehyde from acetylene by passing acetylene at a pressure of approximately 10 pounds per square inch above atmospheric pressure through a sulfuric acid solution containing from 25 to 35% acid, said acid carrying sufficient mercurous sulphate to maintain the temperature of the acid solution at from 68 to 80° C., the step of separating the acetaldehyde from the mixture of acetylene and acetaldehyde so produced, which comprises passing the said mixture through aniline maintained at from 70 to 90° C. and returning the acetylene to the acid solution for further treatment.

9. A process of separating acetaldehyde from a mixture of acetaldehyde and acetylene which comprises passing said mixture through an aromatic primary amine contained in a plurality of tanks connected in series until substantially all the amine in the first tank has combined with acetaldehyde, removing the reaction product so formed, flowing the amine from the second tank into the first tank and continuing the absorption of acetaldehyde from the said mixture.

10. A process of separating acetaldehyde from a mixture of acetaldehyde and acetylene, which comprises passing said mixture through aniline contained in a plurality of tanks connected in series until substantially all the aniline in the first tank has combined with acetaldehyde to form the acetaldehyde derivative of a Schiff's base, removing the reaction product so formed flowing the aniline from the second tank into the first tank and continuing the absorption of acetaldehyde from the said mixture by the aniline contained in the first tank.

In testimony whereof I affix my signature.

CARL N. HAND.